US008196206B1

(12) United States Patent
Gartside et al.

(10) Patent No.: US 8,196,206 B1
(45) Date of Patent: Jun. 5, 2012

(54) NETWORK BROWSER SYSTEM, METHOD, AND COMPUTER PROGRAM PRODUCT FOR SCANNING DATA FOR UNWANTED CONTENT AND ASSOCIATED UNWANTED SITES

(75) Inventors: Paul Nicholas Gartside, Newport Pagnell (GB); George L. Heron, Forest Hill, MD (US); Christopher S. Bolin, Portland, OR (US)

(73) Assignee: McAfee, Inc., Santa Clara, CA (US)

( * ) Notice: Subject to any disclaimer, the term of this patent is extended or adjusted under 35 U.S.C. 154(b) by 1059 days.

(21) Appl. No.: 11/742,455

(22) Filed: Apr. 30, 2007

(51) Int. Cl.
  *H04L 29/06* (2006.01)
(52) U.S. Cl. .............................. 726/24; 726/22; 713/188
(58) Field of Classification Search .................. 726/44
  See application file for complete search history.

(56) References Cited

U.S. PATENT DOCUMENTS

| | | | |
|---|---|---|---|
| 6,035,423 A | 3/2000 | Hodges et al. | |
| 6,088,803 A * | 7/2000 | Tso et al. | 726/22 |
| 6,094,731 A | 7/2000 | Waldin et al. | |
| 6,233,618 B1 * | 5/2001 | Shannon | 709/229 |
| 6,654,751 B1 * | 11/2003 | Schmugar et al. | 1/1 |
| 6,785,732 B1 * | 8/2004 | Bates et al. | 709/232 |
| 6,789,201 B2 * | 9/2004 | Barton et al. | 726/24 |
| 6,802,012 B1 * | 10/2004 | Smithson et al. | 726/24 |
| 7,107,618 B1 | 9/2006 | Gordon et al. | |
| 2002/0178381 A1 | 11/2002 | Lee et al. | 713/201 |
| 2003/0023708 A1 * | 1/2003 | Jung | 709/221 |
| 2003/0097591 A1 * | 5/2003 | Pham et al. | 713/201 |
| 2003/0221129 A1 * | 11/2003 | Hejl | 713/201 |
| 2004/0064737 A1 | 4/2004 | Milliken et al. | |
| 2004/0117648 A1 | 6/2004 | Kissell | |
| 2004/0221014 A1 | 11/2004 | Tomkow | |
| 2005/0015626 A1 | 1/2005 | Chasin | 713/201 |
| 2006/0074809 A1 * | 4/2006 | Meyer | 705/52 |
| 2006/0253582 A1 * | 11/2006 | Dixon et al. | 709/225 |
| 2007/0011739 A1 * | 1/2007 | Zamir et al. | 726/22 |
| 2007/0100999 A1 | 5/2007 | Haider | 709/225 |
| 2008/0208868 A1 | 8/2008 | Hubbard | 707/10 |

OTHER PUBLICATIONS http://webarchive.org/web/*/http://noscript.net/features, 2 pages, printed: Mar. 10, 2010.*
"NoScript—Whitelist JavaScript blocking for a safer Firefox experience!—features—InformAction", 3 pages, archive from May 26, 2005.*
"NoScript—Whitelist JavaScript blocking for a safer Firefox experience!—what is it?—InformAction", 2 pages, Archive from May 26, 2005.*
NoScript—Whitelist JavaScript blocking for a safer Firefox exprience!—screenshots—InformAction, 3 pages, Archive from May 26, 2005.*
"NoScript—Whitelist JavaScript blocking for a safer Firefox experience!—faq—InformAction", 6 pages, Archive from May 26, 2005.*

(Continued)

*Primary Examiner* — Ponnoreay Pich
(74) *Attorney, Agent, or Firm* — Patent Capital Group (57) ABSTRACT

A system, method, and computer program product are provided for scanning data for unwanted content and unwanted sites in response to a user request. In use, a user request is received via a network to scan data prior to downloading the data utilizing a network browser. In addition, the data is scanned for unwanted content and associated unwanted sites in response to the user request. Further, a response is sent to the user via the network.

23 Claims, 6 Drawing Sheets

OTHER PUBLICATIONS

"NoScript—Whitelist JavaScript blocking for a safer Firefox experience!—what isit?—InformAction", 3 pages, Archive from Apr. 9, 2006.*
Lina Berezovska, "Stephen Hawking: Time Travel Possible, But Only Foward", 3 pages, published: Jul. 7, 2010.*
Office Action Summary from U.S. Appl. No. 11/742,423 mailed on May 12, 2009.
U.S. Appl. No. 11/742,423, filed Apr. 30, 2007.
Office Action Summary from U.S. Appl. No. 11/742,423 mailed on Jan. 21, 2010.
Final Office Action Summary from U.S. Appl. No. 11/742,423 mailed on Jul. 8, 2010.
Response to Non-Final Office Action dated May 12, 2009 in U.S. Appl. No. 11/742,423, filed Oct. 12, 2009.
Response to Non-Final Office Action dated Jan. 21, 2010 in U.S. Appl. No. 11/742,423, filed Apr. 21, 2010.
Request for Continued Examination and Amendment in U.S. Appl. No. 11/742,423, filed Jan. 10, 2011.
Non-Final Office Action in U.S. Appl. No. 11/742,423 mailed on Sep. 8, 2011.
U.S. Appl. No. 11/758,494, filed Jun. 5, 2007.
Non-Final Office Action in U.S. Appl. No. 11/758,494 mailed on Aug. 18, 2010.
Response to Non-Final Office Action in U.S. Appl. No. 11/758,494, filed Jan. 18, 2011.
Final Office Action in U.S. Appl. No. 11/758,494 mailed on Mar. 30, 2011.
Request for Continued Examination and Amendment in U.S. Appl. No. 11/758,494, filed Jun. 30, 2011.
Response to Non-Final Office Action dated Sep. 8, 2011 in U.S. Appl. No. 11/742,423, filed Dec. 8, 2011.
Final Office Action in U.S. Appl. No. 11/742,423 mailed on Jan. 30, 2012.
Request for Continued Examination and Amendment in U.S. Appl. No. 11/742,423, filed Apr. 4, 2012.
Non-Final Office Action in U.S. Appl. No. 11/758,494 mailed on Dec. 22, 2011.
Response to Non-Final Office Action dated Dec. 22, 2011 in U.S. Appl. No. 11/758,494, filed Mar. 20, 2012.

* cited by examiner

NETWORK BROWSER SYSTEM, METHOD, AND COMPUTER PROGRAM PRODUCT FOR SCANNING DATA FOR UNWANTED CONTENT AND ASSOCIATED UNWANTED SITES

FIELD OF THE INVENTION

The present invention relates to data analysis, and more particularly to identifying data as being unwanted.

BACKGROUND

Computer users are at increasing risk from various unwanted content (e.g. malware, spyware, etc.) which, on the surface, appears to be legitimate. Without the benefit of in depth knowledge of the operating system and/or extensive computer security experience, it is almost impossible for the average computer user to determine if something is safe or not. Worse yet, if such a computer user relies on a security application (e.g, anti-virus program, etc.), such user may be given a false sense of security. Still yet, there are many security applications that are threats in and of themselves. For example, various "anti-spyware" products employ aggressive marketing only to induce fear and extract money from trusting computer users.

There is thus a need for addressing these and/or other issues associated with the prior art.

SUMMARY

A system, method, and computer program product are provided for scanning data for unwanted content and associated unwanted sites in response to a user request. In use, a user request is received via a network to scan data prior to downloading the data utilizing a network browser. In addition, the data is scanned for unwanted content and associated unwanted sites in response to the user request. Further, a response is sent to the user via the network.

DETAILED DESCRIPTION

Figure 1:
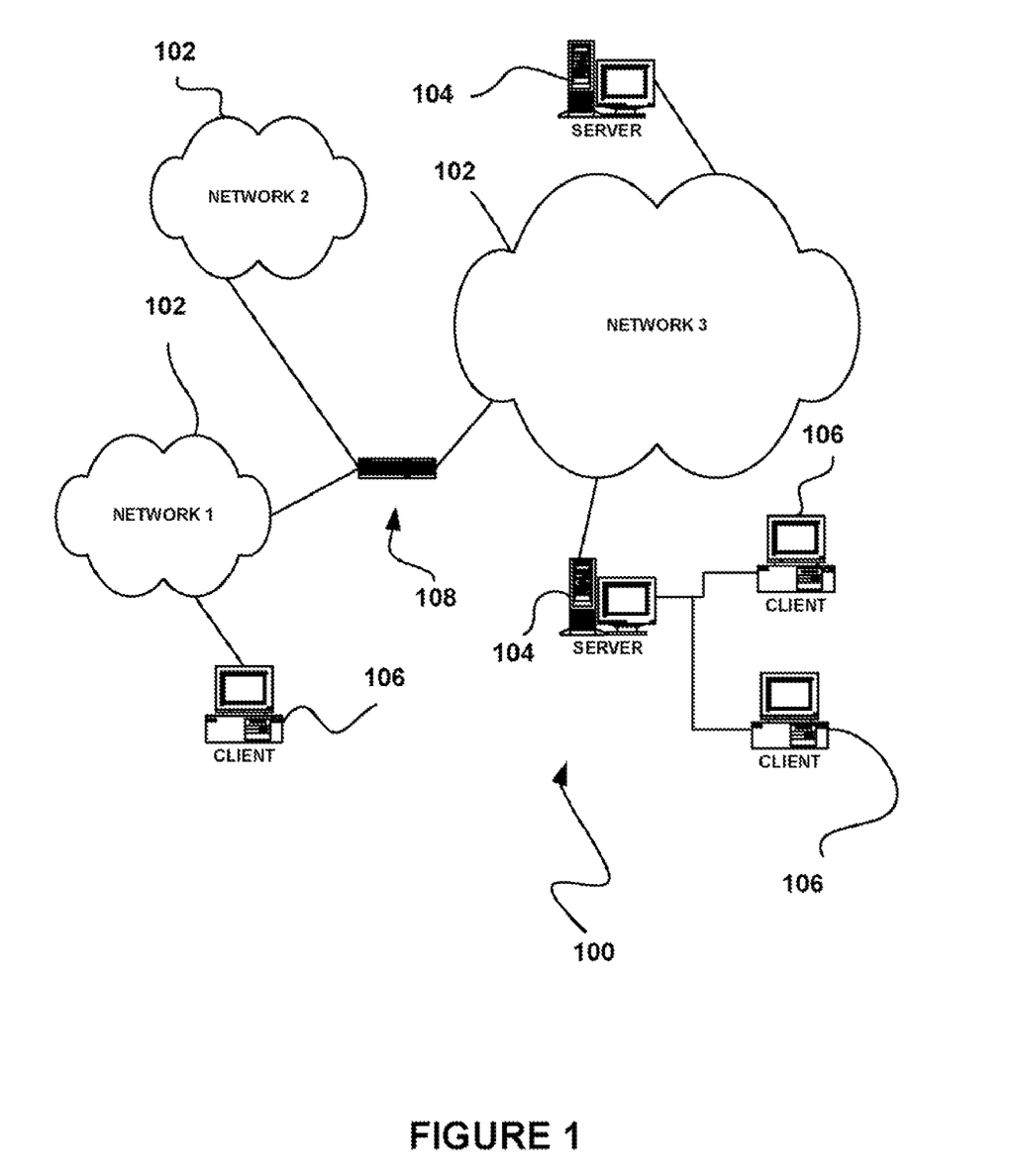
FIG. 1 illustrates a network architecture, in accordance with one embodiment.

FIG. 1 illustrates a network architecture 100, in accordance with one embodiment. As shown, a plurality of networks 102 is provided, in the context of the present network architecture 100, the networks 102 may each take any form including, but not limited to a local area network (LAN), a wireless network, a wide area network (WAN) such as the Internet, peer-to-peer network, etc.

Coupled to the networks 102 are servers 104 which are capable of communicating over the networks 102. Also coupled to the networks 102 and the servers 104 is a plurality of clients 106. Such servers 104 and/or clients 106 may each include a desktop computer, lap-top computer, hand-held computer, mobile phone, personal digital assistant (FDA), peripheral (e.g. printer, etc.), any component of a computer, and/or any other type of logic. In order to facilitate communication among the networks 102, at least one gateway 108 is optionally coupled therebetween.

Figure 2:
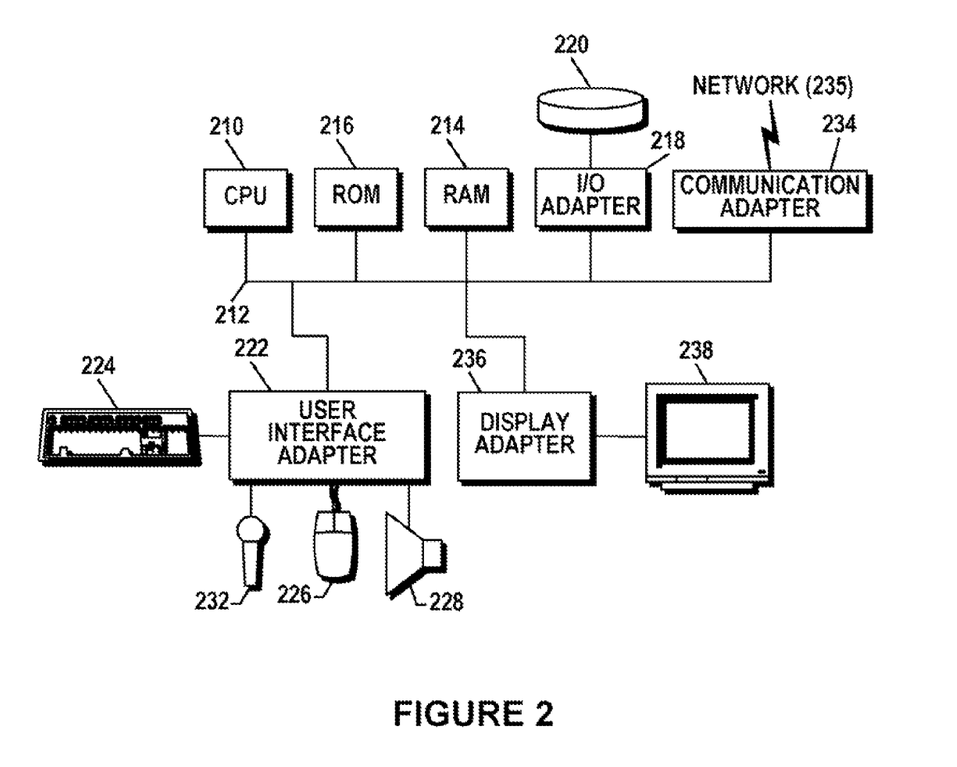
FIG. 2 shows a representative hardware environment that may be associated with the servers and/or clients of FIG. 1, in accordance with one embodiment.

FIG. 2 shows a representative hardware environment that may be associated with the servers 104 and/or clients 106 of FIG. 1, in accordance with one embodiment. Such figure illustrates a typical hardware configuration of a workstation in accordance with one embodiment having a central processing unit 210, such as a microprocessor, and a number of other units interconnected via a system bus 212.

The workstation shown in FIG. 2 includes a. Random Access Memory (RAM) 214, Read Only Memory (ROM) 216, an I/O adapter 218 for connecting peripheral devices such as disk storage units 220 to the bus 212, a user interface adapter 222 for connecting a keyboard 224, a mouse 226, a speaker 228, a microphone 232, and/or other user interface devices such as a touch screen (not shown) to the bus 212, communication adapter 234 for connecting the workstation to a communication network 235 (e.g., a data processing network) and a display adapter 236 for connecting the bus 212 to a display device 238.

The workstation may have resident thereon any desired operating system. it will be appreciated that an embodiment may also be implemented on platforms and operating systems other than those mentioned. One embodiment may be written using JAVA, C, and/or C++ language, or other programming languages, along with an object oriented programming methodology. Object oriented programming (OOP) has become increasingly used to develop complex applications.

Of course, the various embodiments set forth herein may be implemented utilizing hardware, software, or any desired combination thereof For that matter, any type of logic may be utilized which is capable of implementing the various functionality set forth herein.

Figure 3:
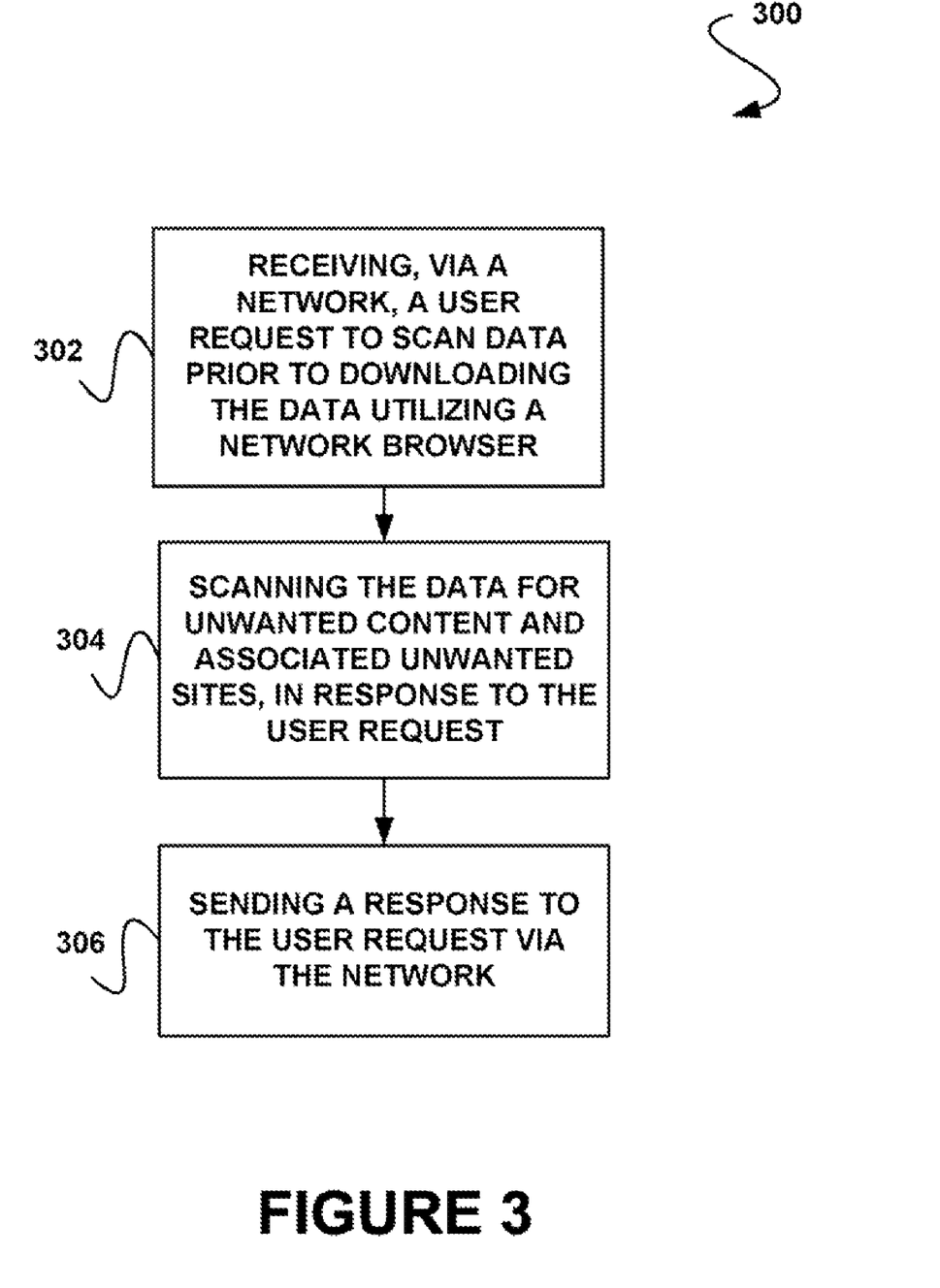
FIG. 3 shows a method for scanning data for unwanted content and associated unwanted sites in response to a user request, in accordance with one embodiment

FIG. 3 shows a method 300 for scanning data for unwanted content and associated unwanted sites in response to a user request, in accordance with one embodiment. As an option, the method 300 may be carried out in the context of the architecture and environment of FIGS. 1 and/or 2. Of course, however, the method 300 may be carried out in any desired environment.

As shown in operation 302, a user request is received via a network to scan data prior to downloading the data utilizing a network browser. In various embodiments, the data may include a web page, a web-based electronic mail (email) message, a file, etc. Of course, however, the data may include any data (or portion thereof) capable of being downloaded utilizing the network browser In the context of the present description, the network browser may include any browser capable of providing an interface to data over the network.

In the context of the present description, the user request may include any request that is initiated by a user to scan the data prior to downloading the data. In one embodiment, the user request may be initiated by selecting the data. Just by way of example, the user request may be initiated by selecting a web link associated with the data. As an option, the user request may be prompted by a mouse click (e.g. of a right mouse button, etc). Of course, however, the user request may be initiated in any desired manner.

Still yet, the request may be generated utilizing the network browser itself and/or an application program associated with the network browser. For example, the application program may include a plug-in installed in association with the network browser. In one embodiment, the user request may be prompted utilizing a network browser tool bar.

Further, in one embodiment, the user request may include the data. For example, the data may accompany the user request. In another embodiment, the user request may include a hash of the data, simply a link associated with the data, etc. It should be noted that the aforementioned hash may be calculated utilizing any desired hashing algorithm.

In yet another embodiment, the user request may optionally include additional information associated with the data. For example, such additional information may include a source of the data. Optionally, the source of the data may include a source address of the data [e.g. email address, uniform resource locator (URL) address, etc.] As another example, the additional information may include a history of the data. Such history may include, as an option, a number of previous instances of the data (e.g. a number of times the data has been downloaded by users, etc.), an owner to which the data is registered, a length of time the data has been available to users, etc.

In yet another example, the additional information may include a path by which the data is communicated. For example, such path may include a series of nodes via which the data is communicated from a source to a destination associated with the user. In still yet other examples, the additional information may include a behavior of the data, a reputation of the data, etc. Of course, the additional information may also include any other information capable of being associated with the data.

In addition, the network via which the user request is received may include any desired network by which a user request may be received. For example, the network may include any of the networks described with respect to FIG. 1. Further, the user request may be received from a client that is utilized by the user and that is capable of downloading the data. Thus, the client may include the network browser. Just by way of example, such client may include any of the clients described with respect to FIGS. 1 and/or 2.

Moreover, the request may be received by a server capable of receiving requests from a plurality of clients and further capable of responding to such requests. In various optional embodiments, the server may include any of the servers described with respect to FIGS. 1 and/or 2. In one embodiment, the server may include a backend server, In another embodiment, the server may be associated with various systems (e.g. intrusion detection systems, virus scanners, domain reputation systems, etc.).

As shown in operation 304, the data is scanned for unwanted content and associated unwanted sites, in response to the user request. In the context of the present description, the unwanted content may include any content (e.g text, images, video, etc.) determined to be unwanted. For example, the unwanted content may include malware (e.g. spyware, adware, spam, rootkits, etc.)

Additionally, the unwanted sites may include any sites (e.g. web sites, etc.) determined to be unwanted. In various embodiments, the unwanted sites may include phishing sites, sites that include unwanted content, etc. Further, the unwanted sites may include sites incorporated in the data to be downloaded, a site from which the data is to be downloaded, and/or sites otherwise associated with the data. As an option, the unwanted content and the unwanted sites may be predetermined. For example, the unwanted content and the unwanted sites may be included within a database (or a plurality of databases) utilized for storing different instances of predetermined unwanted content and unwanted sites.

Furthermore, the scan of the data may include any desired analysis of the data. In various embodiments, the data may be scanned utilizing virus scanners, content scanners, etc. Also, in one embodiment, the data may be scanned utilizing known data. For example, the data may be scanned by performing a comparison of the data with known data stored in a database of known data. As an option, the known data may include known clean data (e.g. data known to not include unwanted content and/or associated unwanted sites, etc.). As another option, the known data may include known unwanted data (e.g. data known to include unwanted content and/or associated unwanted sites, etc.).

In another embodiment, the data may be scanned by performing an automated analysis of the data and any information associated therewith. Optionally, such automated analysis may include a behavioral analysis. For example, the analysis may include analyzing the additional information associated with the data that may be included in the aforementioned request or otherwise obtained.

In yet another embodiment, the data may be scanned by performing a manual analysis of the data. For example, such manual analysis may be performed by a human downloading the data in a secure environment, identifying additional information corresponding to links associated with the downloaded data, etc. Thus, an expert may manually determine whether the data includes unwanted content and any associated unwanted sites.

Still yet, a response to the user request is sent via the network, as shown in operation 306. Optionally, the response may be sent to the device utilized by the user to initiate the request. Of course, however, the response may also be sent to any other desired computer. Just by way of example, the response may be sent to a reporting module that collects responses and data associated therewith, for reporting via a central interface, etc.

Moreover, the response may be sent in response to the comparison of the data to known data resulting in a match. As another option, the response may be sent in response to an indication by the automated analysis that the data is clean (e.g. does not include unwanted content and associated unwanted sites) or unwanted (e.g. includes unwanted data and/or involves associated unwanted sites). As yet another option, the response may be sent in response to an indication by the manual analysis that the data is clean.

In one embodiment, the response may prompt a display of a notification to the user. In another embodiment, the response may indicate that the data does not include unwanted content and associated unwanted sites. For example, the response may indicate that the data is safe for the user to download. In yet another embodiment, the response may indicate that the data does include unwanted content, etc. To this end, the response may indicate that the data is not safe for the user to download.

More illustrative information will now be set forth regarding various optional architectures and features with which the foregoing technique may or may not be implemented, per the desires of the user. It should be strongly noted that the following information is set forth for illustrative purposes and should not be construed as limiting in any manner. Any of the following features may be optionally incorporated with or without the exclusion of other features described.

Figure 4:
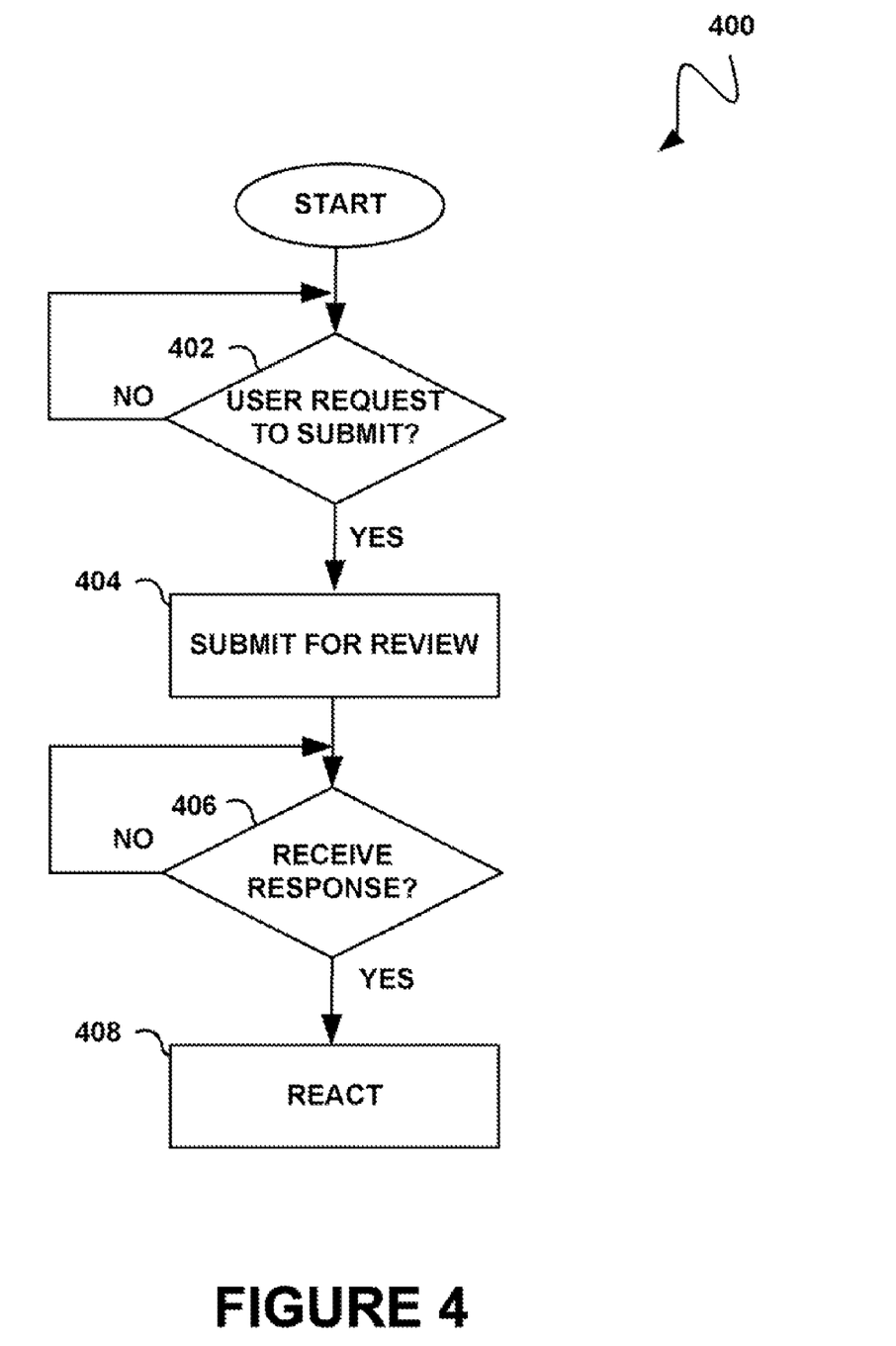
FIG. 4 shows a method for responding to a user request to scan data for unwanted content and associated unwanted sites, in accordance with another embodiment.

FIG. 4 shows a method 400 for responding to a user request to scan data for unwanted content and associated unwanted sites, in accordance with yet another embodiment. As an option, the method 400 may be carried out in the context of the architecture and environment of FIGS. 1-3. Of course, however, the method 400 may be carried out in any desired environment. It should also be noted that the aforementioned definitions may apply during the present description.

As shown in decision 402, it is determined whether a user requests to submit data. In one embodiment, the user may request to submit data utilizing a network browser in which the data is to be displayed. Just by way of example, the user may right click a hyperlink associated with the data utilizing a mouse. Additionally, the user may select an option on a menu (e.g. resulting from the right click) for requesting to submit the data.

Further, in response to the user request to submit data, such data is submitted for review, as shown in operation 404. In various embodiments, submitting the data may include transmitting the data (or portion thereof) and/or the associated link to a server utilizing a network. As mentioned earlier such server may be capable of scanning the data for unwanted content and associated unwanted sites. More information regarding such server-related functionality will be set forth in greater detail during the description of subsequent figures.

As also shown, it is determined whether a response to the user request is received. See decision 406. In the context of the present embodiment, the response may include information associated with a scan of the data for unwanted content and associated unwanted sites.

It should be noted that the response may be received in any desired manner. For example, in one embodiment, the response may be received via a pop-up window. In another embodiment, the response may be received utilizing the network browser via which the request was submitted.

Optionally, the response may be required to be received within a predetermined time period after the request is sent in operation 404. For example, the server may be required to send the response within the predetermined time period. The predetermined time period may be configured (e.g. by an administrator, etc.) as desired. As another option, a lightweight messaging protocol may be utilized for transmitting the response, thus facilitating efficient communication thereof.

In one embodiment, a notification may be sent to the user request prior to sending the response to the user request. For example, the notification may be sent in response to the submission of the user request. Such notification may optionally provide information to the user including, for example, a notice to refrain from downloading the data until the response to the user request is received, a notice as to an estimated wait for the response, etc.

Upon receipt of the response per decision 406, a reaction is performed, as shown in operation 408. In one embodiment, such reaction may be manual. For example, the response may indicate a suggested action for the user to perform with respect to the data. Such suggested action may include not downloading the data, etc.

In another embodiment, the reaction may be automatic. For example, the network browser and/or an accompany application program (e.g. virus scanner, intrusion detection system, etc.) may be utilized to react to the data. For example, such reaction may include downloading and cleaning the data, blocking the data from being downloaded, quarantining the data, etc.

In yet another embodiment, the reaction may include reporting information associated with the data. In this way, the data may be subjected to further analysis. In still yet another embodiment, such reported information may be stored in a database. Of course, it should be noted that any desired reaction may be performed.

Figure 5:
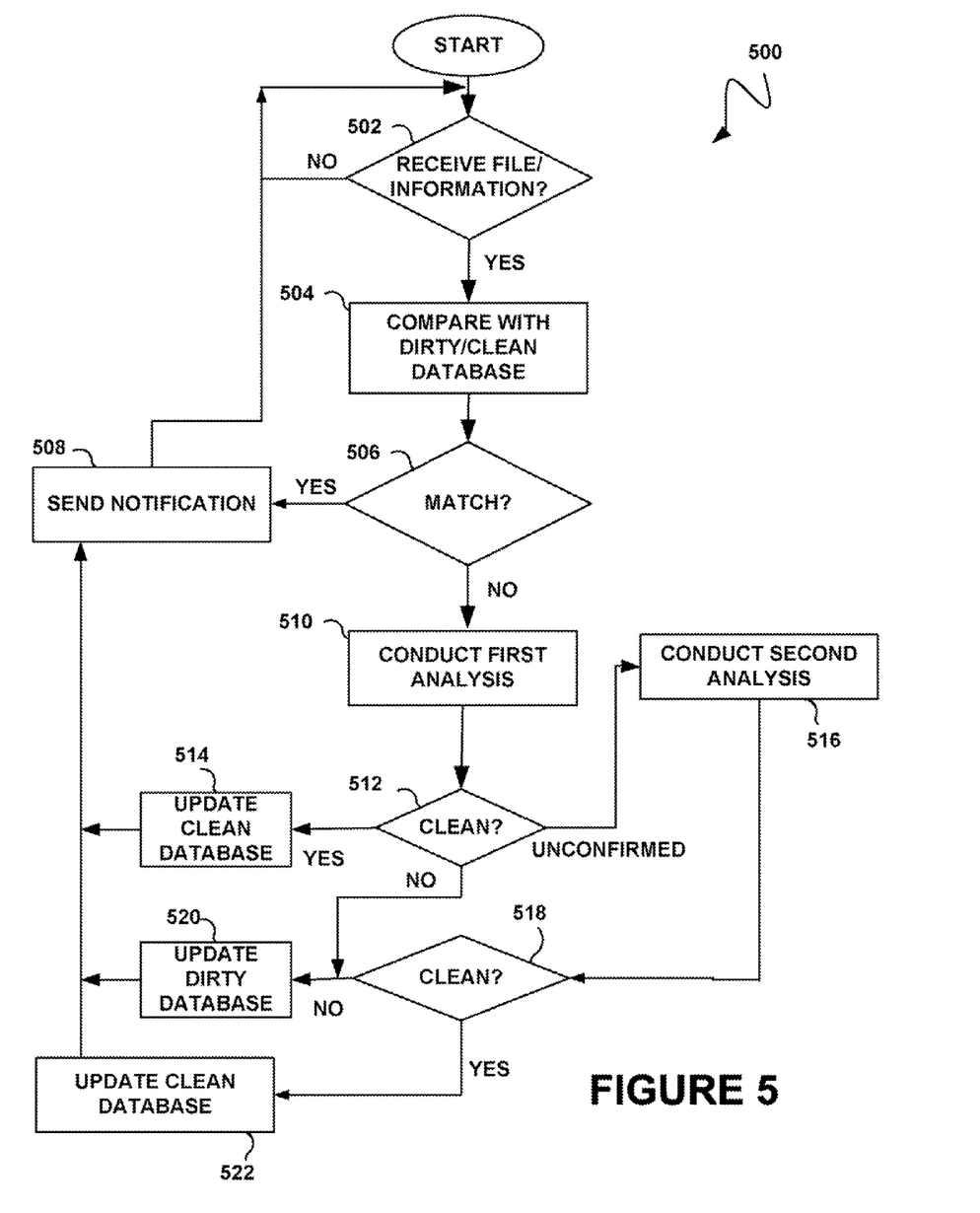
FIG. 5 shows a method for determining a response to a user request to scan data for unwanted content and associated unwanted sites, in accordance with still yet another embodiment.

FIG. 5 shows a method 500 for determining a response to a request to scan data for unwanted content and associated unwanted sites, in accordance with another embodiment. As an option, the method 500 may be carried out in the context of the architecture and environment of FIGS. 1-5. For example, the method 500 of FIG. 5 may be carried out in response to the submission of the operation 404 of FIG. 4. Of course, however, the method 500 may be carried out in any desired environment. It should also be noted that the aforementioned definitions may apply during the present description.

As shown in decision 502, it is determined whether data and associated information (as an option) has been received. For example, such data and associated information may be received at one or more servers where analysis is to take place. To this end, the server may be capable of receiving data and associated information from any desired number of different computers. Thus, as an option, a plurality of computers may be in communication with the server via a network, and may be capable of submitting data and associated information for scanning by the server.

In response to a determination that the data and associated information have been received, the data is compared with known data in a dirty database and/or a clean database. Note operation 504. The dirty database and/or the clean database may include any data structure capable of storing known data. Optionally, the dirty database and/or the clean database may include known data in the form of message digest 5 (MD5) objects to accelerate the comparison. In such embodiment, the data may be received in such format or converted to such format upon receipt by the server.

In one embodiment, the known data may include any data predetermined to be clean or unwanted, such that known clean data may be stored in the clean database and/or known unwanted data may be stored in the dirty database. In various embodiments, the known data may be identified utilizing the present system and/or any system capable of identifying known clean and/or unwanted data.

Just by way of example, the known data may be identified utilizing a domain reputation system. For instance, the known data may be identified utilizing the McAfee® SiteAdvisor™ system. As another example, the known data may be identified utilizing other security applications (e.g. virus scanner, firewall, anti-spam application, intrusion detection system, etc.) installed at different locations (e.g. on different gateways, computers, etc.). In this way, the clean database and/or dirty database may be populated with known data utilizing a community of different systems.

It is further determined whether there is at least one match between the data and any of the known data, as shown in decision 506. If it is determined that a match has been identified, a notification is sent to the computer from which the data and associated information was received. Note operation 508. The notification may include any information capable of notifying a user of the client that the data is respectively clean or unwanted.

For example, if a match between the data and an instance of known data within the clean database is identified, the notification may identify the data as clean. If, however, a match between the data and an instance of known data within the dirty database is identified, the notification may identify the data as being unwanted. Of course, it should be noted that the notification may also include any other desired information, and further be used to prompt any desired reaction.

If it is determined that a match between the data and any of the known data has not been identified, a first analysis is conducted. See operation 510. In the context of the present description, the first analysis may include any analysis that is different from the comparison of operation 504. In one embodiment, the first analysis may include an automatic analysis. Such automatic analysis may include scanning the data for unwanted content and associated unwanted sites, for example, utilizing antivirus scanners, anti-spam scanners, etc.

As another option, the automatic analysis may include a behavior analysis. The behavior analysis may utilize the information associated with the data that was received by the server, for example. In various embodiments, the information may include a history of the data, a source of the data, a path of communication associated with the data, a reputation of the data, and/or any other information associated with the data. Further, the information used in operation 510 may be collected, generated, etc. by the server in real time or in any other desired manner.

Based on the first analysis, it is determined whether the data is clean, as shown in decision 512. If it is determined that the data is clean, the clean database is updated with the data. Note operation 514. In various embodiments, updating the clean database with the data may include updating the clean database with the contents of the data or a hash thereof, etc. As an option, a format of the data may not necessarily be reflected or considered when updating the database. After or in parallel with the database update, a notification of the data being clean is sent to the requesting computer. Again, see operation 508.

If it is determined that the data is not clean based on the first analysis of operation 510, the dirty database is updated with the data. Note operation 520. As also shown, a notification of the data being unwanted is sent to the requesting computer. If, however, it is unconfirmed whether the data is clean based on the first analysis, a second analysis is conducted, as shown in operation 516.

In the context of the present description, the second analysis may include any analysis that is different than the first analysis (see operation 510) and the comparison of the data with the dirty database and/or the clean database (see operation 504). In one embodiment, the second analysis may include a manual analysis. For example, the data may be manually downloaded to a secure area (e.g. virtual machine, etc.) for determining whether the data includes any unwanted data and associated unwanted sites.

Optionally, in response to initiation of the second analysis, a delay notification may be sent to the requesting computer (not shown). The delay notification may be utilized for informing the requesting computer of a possible delay in receiving a response to the originating request. Further, the notification may indicate a time period in which the requesting computer may expect to receive the response. For example, such time period may be based on amount of data being analyzed utilizing the second analysis (i.e. a current load), etc.

Next, it is once again determined whether the data is clean, based on the second analysis. Note decision 518. For example, the second analysis may include a manually generated indication identifying the data as clean or unwanted. If it is determined that the data is clean, the clean database is updated with the data, as shown in operation 522 (which is similar to operation 514). If, however, it is determined that the file is unwanted based on the second analysis, the dirty database is updated with the data. Again, see operation 520. In this way, updates to the database may be utilized during subsequent scans of the data, thus allowing the server to avoid redundant processing of such data.

To this end, the server may be utilized for scanning data transmitted by requesting computers. It should be noted that, while a first and second analysis have been described herein, any desired number of different types of analysis may be utilized. For example, each analysis may optionally be associated with a different system, etc.

Figure 6:
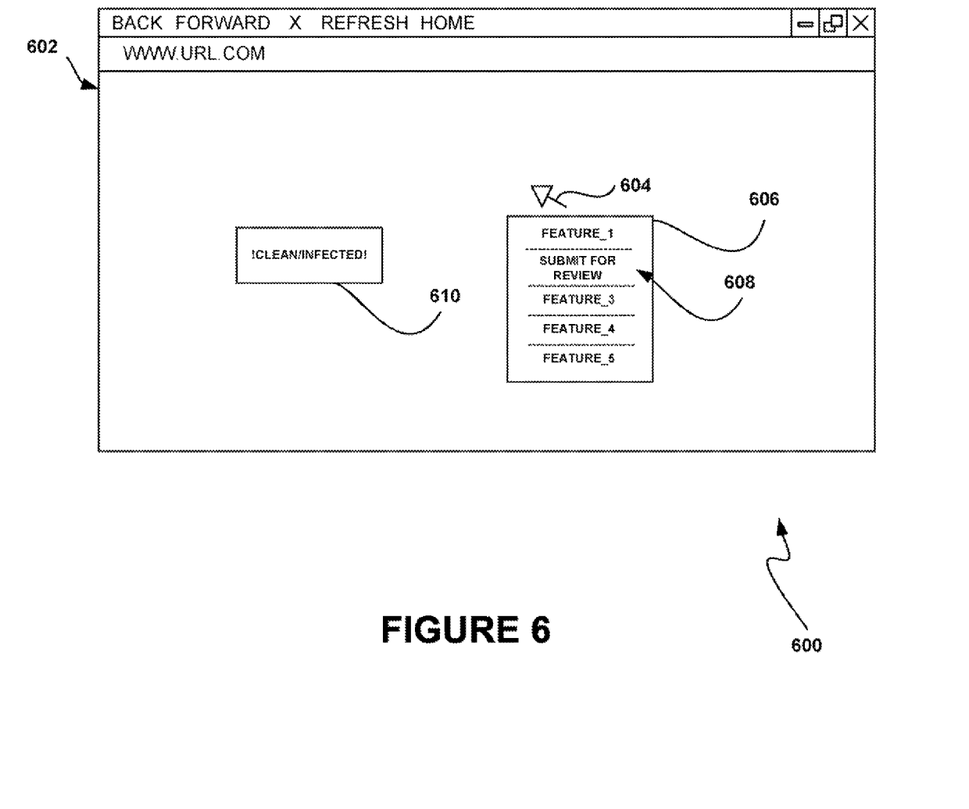
FIG. 6 shows a graphical user interface (GUI) for receiving a request from a user to scan data for unwanted content and associated unwanted sites, in accordance with another embodiment.

FIG. 6 shows a graphical user interface (GUI) 600 for receiving a request from a user to scan data for unwanted content and associated unwanted sites, in accordance with another embodiment. As an option, the GUI 600 may be implemented in the context of the architecture and environment of FIGS. 1-5. For example, the GUI 600 may be used to carry out the method 400 of FIG. 4. Of course, however, the GUI 600 may be implemented in any desired environment. It should also be noted that the aforementioned definitions may apply during the present description.

As shown, the GUI 600 includes a network browser 602 for allowing a user to request that data to be downloaded via the network browser 602 be scanned beforehand. As also shown, the user request may be initiated by pointing a cursor 604 at a link associated with data and clicking a mouse button. For example, the clicking may include clicking a right mouse button.

In response to the click of the mouse button, a menu 606 is displayed. The menu may include a plurality of options (e.g. feature_1 to feature_5, as shown). One of such options 608 may include an option to submit the data for review. Thus, the user may thus select such option 608.

In response to the selection by the user to submit the data for review, the data (or associated link, etc.) is transmitted to a server for scanning. Based on the scanning, the server identifies the data as clean or unwanted. Further, a response 610 to the user request is received for indicating the identification of the data as clean or unwanted, as shown. As also shown, the response 610 may include a pop-up window displayed via the network browser 602.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A method, comprising:
   receiving, via a network, a user request to scan data prior to downloading the data utilizing a network browser, wherein the user request is triggered by selection of the data, and wherein the user request includes a source of the data and a history of the data, which is indicative of a number of times the data was previously downloaded;
   scanning the data for unwanted content and associated unwanted sites; and
   sending a response to the user request via the network.

2. The method of claim 1, wherein the user request includes a link associated with the data.

3. The method of claim 1, wherein the user request includes a hash of the data.

4. The method of claim 1, wherein the user request includes additional information associated with the data.

5. The method of claim 4, wherein the additional information includes at least one of a path by which the data is communicated, and a behavior of the data.

6. The method of claim 1, wherein the data is scanned by performing a comparison of the data with known data stored in a database.

7. The method of claim 6, wherein the known data includes at least one of known clean data and known unwanted data.

8. The method of claim 6, wherein the response is sent in response to the comparison resulting in a match.

9. The method of claim 1, wherein the data is scanned by performing an automated analysis of the data and information associated therewith.

10. The method of claim 9, wherein the response is sent in response to the automated analysis indicating that the data is clean.

11. The method of claim 1, wherein the data is scanned by performing a manual analysis of the data.

12. The method of claim 11, wherein the response is sent in response to the manual analysis indicating that the data is clean.

13. The method of claim 1, wherein a database of known data is updated based on the scanning.

14. The method of claim 1, wherein the response prompts a display of a notification to a user.

15. The method of claim 1, wherein the user request is prompted by a mouse click.

16. The method of claim 1, wherein the user request is prompted utilizing a network browser tool bar.

17. The method of claim 1, wherein the unwanted data includes malware.

18. The method of claim 1, wherein the unwanted sites includes at least one of phishing sites and sites including the unwanted content.

19. The method of claim 1, wherein the request is generated utilizing an application program associated with the network browser.

20. A computer program product embodied on a non-transitory computer readable medium, comprising:

computer code for transmitting, via a network, a user request to scan data prior to downloading the data utilizing a network browser, wherein the user request is triggered by selection of the data, and wherein the user request includes a source of the data and a history of the data, which is indicative of a number of times the data was previously downloaded; and computer code for receiving a response to the user request via the network, the response reflecting a scan of the data for unwanted content and associated unwanted sites that was performed.

21. The computer program product of claim 20, wherein the transmitting is performed by a plug-in installed in association with the network browser.

22. A system, comprising:

a processor;

an application program installed on a client for transmitting, via a network, a user request to scan data prior to downloading the data utilizing a network browser, wherein the user request is triggered by selection of the data, and wherein the user request includes a source of the data and a history of the data, which is indicative of a number of times the data was previously downloaded; and a server in communication with the client via the network for receiving and scanning the data for unwanted content and associated unwanted sites, and sending a response to the user request via the network.

23. The system of claim 22, wherein the server stores results of scanning data transmitted by a plurality of clients in a database, and the scanning utilizes the database.

* * * * *